(No Model.)
W. COLE.
HAY BORING APPARATUS.
No. 601,124. Patented Mar. 22, 1898.
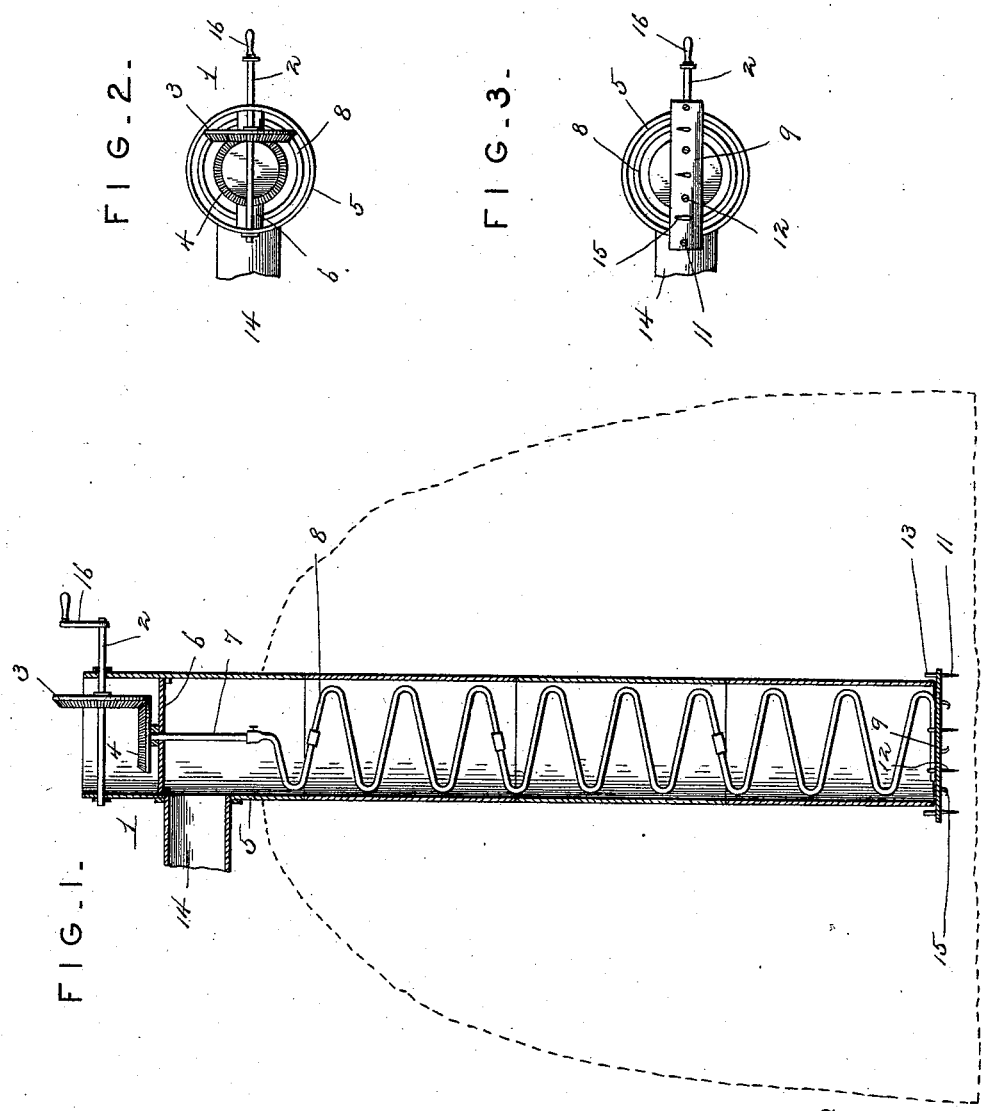
Witnesses
Harry L. Ames.
Victor J. Evans.
Inventor
William Cole.
By John Wedderburn
Attorney

UNITED STATES PATENT OFFICE.

WILLIAM COLE, OF MILLERTON, PENNSYLVANIA.

HAY-BORING APPARATUS.

SPECIFICATION forming part of Letters Patent No. 601,124, dated March 22, 1898.

Application filed June 28, 1897. Serial No. 642,731. (No model.)

*To all whom it may concern:*

Be it known that I, WILLIAM COLE, of Millerton, in the county of Tioga and State of Pennsylvania, have invented certain new and useful Improvements in Hay-Boring Apparatus; and I do hereby declare the following to be a full, clear, and exact description of the invention, such as will enable others skilled in the art to which it appertains to make and use the same.

This invention relates to a boring apparatus for cutting or boring shafts or tunnels in a mow or pile of hay or straw and grain in the straw before being threshed.

Various devices and contrivances have been provided and resorted to to make holes through the mow to facilitate the escape of the internal heat.

The object of my invention is to overcome the difficulties hitherto encountered and to provide a cutter or borer which will withdraw the core or body of hay and leave the sides of the shaft or flue as loose and free as any other part of the haymow.

To this end my invention consists in the combination of a tube or cylinder, a series of cutters or knives arranged to rotate just outside and inside the cylinder, an auger-shaft operatively connected with the rotating knife-head, and suitable gearing connecting a crank-shaft with the auger-shaft, whereby a cylindrical hole or shaft may be bored in a mass of hay or straw.

The invention also consists in other combinations of instrumentalities hereinafter described and specifically claimed.

In the drawings, Figure 1 is a sectional view showing the cylinder and a body of hay in section, the crank-shaft, the auger-shaft, the intermediate gearing, the wormer, the knife or cutter heads, and the knives in elevation. Fig. 2 is a plan or top view of my apparatus. Fig. 3 is a bottom plan or a view looking at the bottom and showing the arrangement of the knives with relation to the tube or cylinder.

In constructing my improved boring apparatus I provide a framework which is preferably of cast-iron, the framework being adapted to be coupled with or secured upon the upper end of a tube. Mounted in this frame 1 is a crank-shaft 2, carrying bevel-wheel 3, which intergears with bevel-wheel 4, suitably supported on a bracket or ledge of the frame 1.

5 is a tube-section which in practice will be about four inches in diameter and will be arranged so that sections may be readily added to the lower section in order to extend the tube down through any depth of hay.

Across the bottom of the frame 1 is a thwart or bar 6, having a perforation in the middle, which forms a support for the upper end of the auger-shank 7. The auger-shank is also built up or may be built up of sections, so as to correspond with and become extended whenever a tube-section is adjusted to lengthen the tube. The auger-shank is adapted to be coupled with or connected to a part 8, which I call a "wormer." It is a spirally-bent rod which fits with considerable freedom within the tube and is connected at one end with a bar 9 and at the other or upper end with the auger-shank. The bar 9 is a horizontally-arranged bar carrying knives 11 on its extremities, which are just outside of the periphery of the tube, and also knives 12 12 within the range of the tube. The tube rests on top of the bar 9, and said bar is prevented from lateral movement with relation to said tube by means of upwardly-projecting pins or studs 13, as shown. In one side of the upper section of the tube is provided a door or passage 14 for the purpose of providing a way to discharge hay that may be raised up in the tube.

In operation my apparatus is erected or supported in an upright position on the top of a body of hay. The crank is turned, thereby operating the auger-shank through the gearing described, the auger-shank rotating the wormer, which fits within the tube, the wormer in turn revolving the knife-bar and the knives, which cut their way down into the haymow, and by reason of the knives or projections 15 on the knife-bar the hay which has been cut is picked up and gradually elevated through the means of the wormer and brought to the top, where it can be withdrawn through the door or passage. In this way a clean hole may be bored in a pile of hay or straw the side walls of which will be as open and free as any part of the mow, and will thus permit of the free ventilation or escape of hot gases from the bottom up through the mass of hay.

By this means I am enabled to perfectly cure my hay without danger of loss from burning or molding or fear of its becoming musty.

In use the tube or cylinder is supported and held in proper position by means of a handle 16.

Having now described my invention, what I claim as new, and desire to secure by Letters Patent, is—

1. In an apparatus for boring hay, the combination of a tube or cylinder, a knife-bar carrying knives upon which the cylinder rests, a series of fingers or projections connected with the knife-bar, a wormer or elevator for lifting the cuttings within the cylinder, upward projections on the bar to prevent lateral movement with relation to the tube, and means for imparting motion to the wormer and cutter, substantially as described.

2. In a hay-boring apparatus having a rotary shaft and means for operating the same, the combination with said shaft of a wormer, a knife-bar carrying knives outside the periphery of the tube or cylinder and also carrying knives within the periphery of said tube or cylinder, and carrying fingers for loosening and picking up the hay, and upward projections connected with the knife-bar to prevent lateral movement of said bar with relation to the tube, substantially as described.

In testimony whereof I have signed this specification in the presence of two subscribing witnesses.

WILLIAM COLE.

Witnesses:
JESSE B. MILLER,
A. J. MOSHER.